United States Patent [19]
Miyake et al.

[11] 3,914,315
[45] Oct. 21, 1975

[54] METHOD FOR PREPARING 5-CYCLOHEXADECEN-1-ON

[75] Inventors: Akihisa Miyake; Hisao Kondo, both of Kamakura; Takashi Nishidoi, Otsu; Osamu Onnagawa, Kamakura, all of Japan

[73] Assignee: Toray Industries, Inc., Tokyo, Japan

[22] Filed: Sept. 20, 1973

[21] Appl. No.: 399,074

[30] Foreign Application Priority Data
Sept. 27, 1972 Japan.................. 47-96227

[52] U.S. Cl. ......... 260/586 R; 252/522; 260/586 M; 260/617 M
[51] Int. Cl.² .......................... C07C 45/00

[58] Field of Search ............... 260/586 A, 586 R

[56] References Cited
FOREIGN PATENTS OR APPLICATIONS
2,165,113   7/1972   Germany .................. 260/586 A OTHER PUBLICATIONS
Marvell et al., "Tetra. Letters," Vol. 1970, No. 7, pp. 509–512 (1970).

*Primary Examiner*—Norman Morgenstern

[57] ABSTRACT

5-cyclohexadecen-1-on is prepared in a high yield by heat treating 1,2-divinyl-cyclododecan-1-ol in the presence of N,N-dialkyl carboxylic acid amide, N-alkyl lactam or sulfoxide.

8 Claims, No Drawings

METHOD FOR PREPARING 5-CYCLOHEXADECEN-1-ON

BACKGROUND OF THE INVENTION

1. Field of the Invention

The present invention relates to a method for preparing 5-cyclohexadecen-1-on in a high yield which is useful as a powerful musk fragrance in the perfumery industry.

2. Description of the Prior Art

Heretofore, 15–18 membered cyclic ketones have been known to be characterized by a musk-like odor. Among these cyclic ketones, 16-membered cyclic ketones have attracted much attention as compounds having a characteristic musk-like odor. Previously, we have discovered 5-cyclohexadecen-1-on which has different musky fragrance and a rather clean animal-like odor and has an extremely powerful intensity compared with those of the other 16-membered cyclic ketones. The invention further relates to a method for preparing such cyclic ketones.

We filed a U.S. patent application relating to the above invention, as Ser. No. 173,283, disclosing a method for preparing 5-cyclohexadecen-1-on by heat treating 1,2-divinyl cyclododecan-1-ol. In that method, the yield of 5-cyclohexadecen-1-on based on 1,2-divinyl cyclododecan-1-ol was at most 80 mole %.

SUMMARY OF THE INVENTION

The present invention relates to development of a method for preparing 5-cyclohexadecen-1-on from 1,2-divinyl cyclododecan-1-ol in a high yield.

DESCRIPTION OF THE PREFERRED EMBODIMENT

In this invention, 5-cyclohexadecen-1-on is prepared by heating 1,2-divinyl cyclododecan-1-ol in the presence of at least one member selected from a group consisting of specific N,N-dialkyl carboxylic acid amides, N-alkyl lactams and sulfoxides, preferably at a temperature of about 150°–300°C. This process according to this invention allows an increase of yield of product, up to a yield of 95 mole % or even more.

N,N-dialkyl carboxylic acid amide in accordance with this invention is a compound corresponding to a carboxylic acid amide derived from a carboxylic acid and a secondary amine, and is preferably represented by the formula:

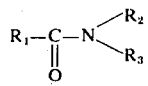

wherein $R_1$ is H or alkyl having 1 to 6 carbon atoms, and $R_2$ and $R_3$ are alkyl groups having 1 to 6 carbon atoms. Examples of preferred carboxylic acid amides include N,N-dimethyl formamide, N,N-dimethyl acetamide, N,N-dimethyl propionamide, N,N-dimethyl butyramide, N,N-diethyl formamide, N,N-diethyl acetamide, N,N-dipropyl formamide, N,N-dibutyl formamide and N-methyl-N-ethyl acetamide. N-alkyl lactam is preferably represented by the formula:

wherein $n$ is an integer from 2 to 11 and $R_4$ is an alkyl group having from 1 to 6 carbon atoms. Examples of preferable N-alkyl lactams involve N-methyl pyrrolidone, N-ethyl pyrrolidone, N-propyl pyrrolidone, N-methyl valerolactam, N-methyl caprolactam, N-ethyl caprolactam, N-methyl laurolactam and N-ethyl laurolactam.

The sulfoxide is preferably represented by the formula:

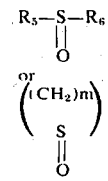

wherein $R_5$ and $R_6$ are alkyl groups having 1 to 4 carbon atoms, and $m$ is an integer from 4 to 6. Examples of preferred sulfoxides include dimethyl sulfoxide, diethyl sulfoxide, methyl ethyl sulfoxide, dipropyl sulfoxide, dibutyl sulfoxide, tetramethylene sulfoxide and hexamethylene sulfoxide. In regard to the amount of N,N-dialkyl carboxylic acid amide, or N-alkyl lactam or sulfoxide to be used in this invention, this may be preferably about 1 to 10 times, more preferably about two to five times, by weight based upon the amount by weight of 1,2-divinyl cyclododecan-1-ol used. Addition of such additives to the reaction system prevents the occurrence of side reactions and sharply increases the yield of the main product. The outstanding effectiveness of this invention appears to depend upon the selective affinity of the additives with the hydroxy group of the 1,2-divinyl cyclododecan-1-ol. The method of this invention can be carried out easily. For example, an additive comprising N,N-dialkyl carboxylic acid amide, or N-alkyl lactam or sulfoxide may be added to 1,2-divinyl cyclododecan-1-ol and the resulting solution heated to a preferable temperature of about 150°C-300°C, more preferably about 160°–200°C, usually for about 1–10 hours, and then the additive is separated from the solution to obtain 5-cyclohexadecen-1-on in a high yield. 1,2-divinyl cyclododecan-1-ol to be used as the starting material of the process is usually a mixture of the cis-isomer and the trans-isomer, and may be used directly in the pure state or even with certain impurities. Since 1,2-divinyl cyclododecan-1-ol is preferably produced by reacting 2-halo-cyclododecan-1-on with vinyl magnesium halide and hydrolyzing the reaction product, it usually contains halogen in the form of one or more halogenated compounds as impurities, and may be used without removing such impurities. In such case, it is quite effective to add a small amount of inorganic alkaline material such as sodium carbonate, potassium carbonate, sodium bicarbonate, sodium hydroxide or ammonia, or an organic base such as pyridine, quinoline, triethylamine, morpholine or dimethyl amine into the reaction system at the time of heating. The amount of basic material to be added is preferably about 1 to 50 molecular equivalents per halogen atom present in the impurities in the starting material. Another preferable procedure in such case involves the pretreatment of the 1,2-divinyl cyclododecan-1-ol which includes the halogen impurities, prior to heat treatment. According to this procedure the crude starting material is contacted in water, methanol or ethanol with an inorganic base such as mentioned above, at a temperature of preferably 0°–50°C and for preferably 2–10 hours while stirring, in a manner to dehalogenate the material. The amount of inorganic base to be used in this procedure is preferably about 1 to 50 molecular equivalents per halogen atom.

The following examples further illustrate specific procedures in accordance with this invention:

EXAMPLE 1

Ten grams of pure 1,2-divinyl cyclododecan-1-ol (a 60:40 mixture of the cis and trans isomers) were dissolved in 60 grams of N,N-dimethyl acetamide and stirred for 3 hrs. at 180°C under an atmosphere of nitrogen.

After cooling to room temperature, N,N-dimethyl acetamide was distilled off under reduced pressure and by distillation of the residual substance, 9.6 grams of 5-cyclohexadecen-1-on were obtained as a fraction having a b.p - 120°c/1 torr. (95% yield).

In the absence of the N,N-dimethyl acetamide, using the same procedure, the yield of 5-cyclohexadecen-1-on was only 78%.

EXAMPLE 2

10 grams of pure 1,2-divinyl cyclododecan-1-ol (a 60:40 mixture of the cis and trans isomers) were dissolved in 40 grams of N,N-dimethyl formamide and stirred for 6 hrs. at 170°C. After cooling, the N,N-dimethyl formamide was distilled off under reduced pressure. By distillation of the residual substance, 9.4 grams of 5-cyclohexadecen-1-on were obtained as a fraction having a b.p. - 120°C/1 torr. (94% yield).

The same reaction was carried out using the following compounds instead of dimethyl formamide: N,N-diethyl acetamide, N,N dimethyl propionamide, and N-methyl-N-ethyl acetamide. The resulting yields of 5-cyclohexadecen-1-on were 95, 95 and 96%, respectively.

EXAMPLE 3

10 grams of pure 1,2-divinyl cyclododecan-1-ol (a 60:40 mixture of the cis and trans isomers) were dissolved in 50 grams of N-methyl pyrrolidone and stirred for 6 hrs. at 170°C. After cooling to room temperature, N-methyl pyrrolidone was distilled off and by distillation of the residual substance, 9.5 grams of 5-cyclohexadecen-1-on were obtained as a fraction having a b.p. - 120°C/1 Torr. (95% yield).

EXAMPLE 4

10 grams of pure 1,2-divinyl cyclododecan-1-ol (a 60:40 mixture of the cis and trans isomer) were dissolved in 60 grams of N-methyl caprolactam and stirred for 3 hrs. at 180°C. After cooling, N-methyl caprolactam was distilled off under reduced pressure and by distillation of the residual substance, 9.3 grams of 5-cyclohexadecen-1-on were obtained as a fraction having a b.p. - 120°c/1 torr. (93% yield).

EXAMPLE 5

10 grams of pure 1,2-divinyl cyclododecan-1-ol (a 60:40 mixture of the cis and trans isomers) were dissolved in 80 grams of N-ethyl pyrrolidone and stirred for 3 hrs. at 180°C. After cooling, N-ethyl pyrrolidone was distilled off under reduced pressure and, by distillation of the residual substance, 9.4 grams of 5-cyclohexadecen-1-on were obtained as a fraction having a b.p - 120°C/1 torr. (94% yield). The same reaction was conducted by using the following solvents instead of N-ethyl pyrrolidone, with the yield of 5-cyclohexadecen-1-on obtained stated immediately after the designation of each solvent: N-propyl pyrrolidone (92%), N-methyl piperidone (95%), N-ethyl piperidone (91%), N-ethyl caprolactam (92%).

EXAMPLE 6

10 Grams of pure 1,2-divinyl cyclododecan-1-ol (a 50:50 mixture of the cis and trans isomers) were dissolved in 50 grams of dimethyl sulfoxide and stirred for 1.5 hrs. at 190°C. After cooling, dimethyl sulfoxide was distilled off under reduced pressure and, by distillation of the residual substance, 9.7 grams of 5-cyclohexadecen-1-on were obtained as a fraction having a b.p. - 120°C/1 torr. (97% yield). The same reactions in different solvents (methyl ethyl sulfoxide and dibutyl sulfoxide) gave cyclohexadecen-1-on yields of 98% and 94% respectively. In the absence of the above solvents, the yield was 78%.

EXAMPLE 7

10 Grams of pure 1,2-divinyl cyclododecan-1-ol (a 50:50 mixture of the cis and trans isomers) were dissolved in 40 grams of tetramethylene sulfoxide and stirred for 3 hrs. at 180°C. After cooling, tetramethylene sulfoxide was distilled off under reduced pressure and by distillation of the residual substance, 9.2 grams of 5-cyclohexadecen-1-on were obtained as a fraction having a b.p. - 120°C/1 torr. (92% yield).

EXAMPLE 8

122 Grams of crude 1,2-divinyl cyclododecan-1-ol (82.1% purity and having an isomer ratio of cis 57 and trans 43) containing 4.3% of 1-vinyl-2-chlorocyclododecan-1-ol as an impurity, which was obtained from the reaction of 2-chlorocyclododecan-1-on and vinyl magnesium chloride in tetrahydrofuran, was dissolved in 500 grams of N-methyl pyrrolidone. To the resulting solution, 2 grams of sodium carbonate and 2 grams of ammonium chloride were added and the solution was stirred for 6 hrs. at 170°C. After cooling, N-methyl pyrrolidone was distilled off under reduced pressure and, by distillation of the residual substance, 112 grams of a distillate of 5-cyclohexadecen-1-on (83.5% purity) were obtained (95% yield). In the same reaction without the solvent, the yield of 5-cyclohexadecen-1-on was 72%. Instead of N-methyl pyrrolidone, N-ethyl pyrrolidone and N-methyl caprolactam were used as solvents, and the yields of 5-cyclohexadecen-1-on were 95% and 96% respectively.

EXAMPLE 9

122 Grams of crude 1,2-divinyl cyclododecan-1-ol as used in Example 8 were dissolved in 500 grams of N-methyl pyrrolidone. After adding 5 grams of pyridine to this solution, the mixture was stirred for 6 hrs. at 170°C. After cooling, N-methyl pyrrolidone was distilled off under reduced pressure and, by distillation of the residual substance, 115 grams of a distillate of 5-cyclohexadecen-1-on (82.5% purity) were obtained as a fraction having a b.p. - 120°C/1 torr. (94% yield). The same results were obtained by using triethylamine, morpholine, dimethylamine, sodium carbonate, potassium carbonate and sodium hydroxide as the base, instead of pyridine.

EXAMPLE 10

122 Grams of the same crude 1,2-divinyl cyclododecan-1-ol as used in Example 8 were dissolved in 400 grams of N,N-dimethyl acetamide and, after addition of 3.7 grams of dimethylamine, the solution was stirred for 3 hrs. at 180°C. N,N-dimethyl acetamide was distilled off under reduced pressure and, by distillation of the residual substance, 122 grams of a distillate of 5-cyclohexadecen-1-on (81.2% purity) were obtained as a fraction having a b.p. - 120°C/1 torr. (91% yield). Instead of dimethyl acetamide, dimethyl formamide, N,N-diethyl acetamide, and N,N-dimethyl propionamide were employed, and the yields of 5-cyclohexadecen-1-on were 90, 90 and 93% respectively.

EXAMPLE 11

122 Grams of the same crude 1,2-divinyl cyclododecan-1-ol as used in Example 8 were dissolved in 350 grams of dimethyl sulfoxide, and after adding 7.0 grams of triethylamine to the solution, the resulting mixture was stirred for 1 hr. at 190°C. Dimethyl sulfoxide was distilled off under reduced pressure, and by distillation of the residual substance, 113 grams of a distillate of 5-cyclohexadecen-1-on (79.9% purity) were obtained as a fraction having a b.p. - 120°C/1 torr. (89% yield).

EXAMPLE 12

128 grams of crude 1,2-divinyl cyclododecan-1-ol (purity 78.3%, Cl content 1.03 wt %) were dissolved in 150 ml of 1N sodium hydroxide soln. of ethanol and stirred for about 2 hrs. at room temperature. After an addition of 150 ml of water, the solution was extracted with benzene, and the extract was washed with water until it became neutral. Evaporation of benzene from the extract left 126 grams of an oily residue. No halogen was detected when Beilstein's test was applied to the residue.

The residue was dissolved in 450 grams of N-methyl pyrrolidone and stirred for 6 hrs. at 165°–7°C. After cooling, N-methyl pyrrolidone was distilled off under reduced pressure and by distillation of the residual substance, 115 grams of a distillate of 5-cyclohexadecen-1-on (82.4% purity) were obtained as a fraction having a b.p. - 120°C/1 torr. (95% yield). The results obtained by using other N-alkyl lactams as solvents are as follows: N-methyl piperidone (94%), N-methyl caprolactam (94%), N-ethyl pyrrolidone (93%), N-propyl-pyrrolidone (95%).

EXAMPLE 13

128 grams of crude 1,2-divinyl cyclododecan-1-ol (purity 78.3%, Cl content 1.03 wt %) were dissolved in 150 ml. of 1N potassium hydroxide solution of methanol and stirred for about 2 hrs. at room temperature. After adding 150 ml of water to the solution, the solution was extracted with benzene and washed with water until it became neutral. Evaporation of benzene from the extract left 124 grams of an oily residue, the Beilstein test of which was negative.

The oily residue was dissolved in 550 grams of N,N-dimethyl formamide and stirred for 3 hrs. at 180°C. After cooling, N,N-dimethyl formamide was distilled off under reduced pressure and, by distillation of the residual substance, 112 grams of a distillate of 5-cyclohexadecen-1-on (78.5% purity) were obtained as a fraction having a b.p. - 120°C/1 torr. (89% yield).

EXAMPLE 14

126 Grams of the halogen-free crude 1,2-divinyl cyclododecan-1-ol obtained by the treatment made in the Example 12, were dissolved in 500 grams of N,N-dimethyl acetamide and stirred for 5 hrs. at 170°C. After cooling, N,N-dimethyl acetamide was distilled off under reduced pressure and, by distillation of the residue, 116 grams of a distillate of 5-cyclohexadecen-1-on (80.5% purity) were obtained as a fraction having a b.p. - 120°C/1 torr. (93% yield). The results obtained by using other N,N-dialkyl amides are as follows: N,N-diethyl acetamide (92%), and N,N-dimethyl propionamide (95%).

EXAMPLE 15

126 Grams of the halogen-free crude 1,2-divinyl cyclododecan-1-ol, obtained by alkali treatment as in Example 12, were dissolved in 500 grams of dimethyl sulfoxide and stirred for 5 hrs. at 170°C. After cooling, dimethyl sulfoxide was distilled off under reduced pressure and, by distillation of the residue, 113 grams of a distillate of 5-cyclohexadecen-1-on (79.1% purity) were obtained as a fraction having a b.p. - 120°C/1 torr. (89% yield).

We claim:

1. A method for preparing 5-cyclohexadecen-1-on which comprises heating 1,2-divinyl cyclododecan-1-ol at a temperature ranging from about 150°C to about 300°C in the presence of a compound selected from the group consisting of:

a. an N-alkyl N-alkyl carboxylic acid amide represented by the formula

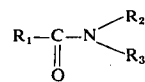

wherein $R_1$ is H or an alkyl radical having 1 to 6 carbon atoms, and $R_2$ and $R_3$ are alkyl radicals having 1 to 6 carbon atoms, b. an N-alkyl lactam represented by the formula

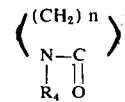

wherein $n$ is an integer from 2 to 11, inclusive, and $R_4$ is an alkyl group having 1 to 6 carbon atoms, and c. a sulfoxide selected from the group consisting of

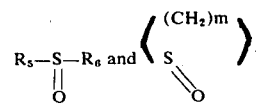

wherein $R_5$ and $R_6$ are alkyl radicals having 1 to 4 carbon atoms and m is an integer from 4 to 6 inclusive.

2. The method according to claim 1 wherein said reaction is carried out in the presence of a small amount of organic amine or inorganic base selected from the group consisting of the hydroxides, carbonates and bicarbonates of sodium potassium, and ammonia.

3. The method according to claim 1, wherein said 1,2-divinyl cyclododecan-1-ol is previously treated by contacting crude 1,2-divinyl cyclododecan-1-ol with a small amount of inorganic base selected from the group consisting of the hydroxides, carbonates and bicarbonates of sodium potassium, and ammonia in water, methanol or ethanol at a temperature below about 50°C.

4. The method according to claim 1, wherein said N,N-dialkyl carboxylic acid amide is N,N-dimethyl formamide.

5. The method according to claim 1, wherein said N,N-dialkyl carboxylic acid amide is N,N-diethyl formamide.

6. The method according to claim 1, wherein said N-alkyl lactam is N-methyl pyrrolidone.

7. The method according to claim 1, wherein said N-alkyl lactam is N-methyl caprolactam.

8. The method according to claim 1, wherein the amount of N,N-dialkyl carboxylic acid amide, N-alkyl lactam or sulfoxide is within 1 to 10 times by weight based on the amount of 1,2-divinyl cyclododecan-1-ol.

* * * * *